(12) United States Patent
Moesle et al.

(10) Patent No.: US 9,832,398 B2
(45) Date of Patent: Nov. 28, 2017

(54) CAMERA SYSTEM, ESPECIALLY FOR A VEHICLE, AND METHOD FOR ASCERTAINING IMAGE INFORMATION OF A SIGNAL SOURCE PULSED AS A FUNCTION OF TIME

(71) Applicant: Robert Bosch GmbH, Stuttgart (DE)

(72) Inventors: Frank Moesle, Stuttgart (DE); Daniela Weiss, Hildesheim (DE); Paul Ruhnau, Leonberg-Hoefingen (DE); Dimitrios Bariamis, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 335 days.

(21) Appl. No.: 14/603,922

(22) Filed: Jan. 23, 2015

(65) Prior Publication Data
US 2015/0208005 A1    Jul. 23, 2015

(30) Foreign Application Priority Data

Jan. 23, 2014   (DE) .......................... 10 2014 201 181

(51) Int. Cl.
*H04N 5/353*   (2011.01)
*H04N 5/235*   (2006.01)
(Continued)

(52) U.S. Cl.
CPC ......... *H04N 5/3537* (2013.01); *H04N 5/2254* (2013.01); *H04N 5/2353* (2013.01); *H04N 5/2355* (2013.01); *H04N 5/35554* (2013.01); *H04N 5/35563* (2013.01); *H04N 9/045* (2013.01)

(58) Field of Classification Search
None
See application file for complete search history.

(56) References Cited

U.S. PATENT DOCUMENTS 4,504,863 A * 3/1985 Lacoste ............... H04N 5/21
                                                        348/618
7,567,291 B2 * 7/2009 Bechtel ............... G07C 5/0891
                                                        348/342
(Continued)

FOREIGN PATENT DOCUMENTS

DE          69808024       6/2003
DE          102005033863   1/2007
DE          102010024415   12/2011

*Primary Examiner* — Frederick Bailey
(74) *Attorney, Agent, or Firm* — Norton Rose Fulbright US LLP; Gerard Messina (57) ABSTRACT

A camera system is described, particularly for a vehicle, the camera system having at least: a camera which has an image sensor and a filter mask, and a control and evaluation device which receives image signals output by the image sensor, the image sensor having an array of sensor pixels outputting pixel signals, and the filter mask having an array of filters which are disposed in front of the sensor pixels and have different wavelength-selective transmission response, a portion of the filters being attenuation filters, and sensor pixels, in front of which in each case one of the attenuation filters is disposed, outputting attenuation pixel signals. The attenuation filters advantageously attenuate white light more strongly than the other filters of the filter mask; in particular, they are blue pixels.

25 Claims, 5 Drawing Sheets

(51) Int. Cl.
*H04N 9/04* (2006.01)
*H04N 5/225* (2006.01)
*H04N 5/355* (2011.01)

(56) References Cited

U.S. PATENT DOCUMENTS

2004/0056966 A1* 3/2004 Schechner ............ H04N 5/2254
348/229.1
2010/0172542 A1* 7/2010 Stein .................. G06K 9/00798
382/103
2014/0320607 A1* 10/2014 Hamann ............ H04N 5/23296
348/47

* cited by examiner

CAMERA SYSTEM, ESPECIALLY FOR A VEHICLE, AND METHOD FOR ASCERTAINING IMAGE INFORMATION OF A SIGNAL SOURCE PULSED AS A FUNCTION OF TIME

FIELD OF THE INVENTION

The present invention relates to a camera system usable particularly in a vehicle, and a method for ascertaining image information of a signal source pulsed as a function of time, especially a variable message sign.

BACKGROUND INFORMATION

Vehicle camera systems are used, first of all, to generate an image which may be displayed on a display device, for example. In addition, such camera systems are also used to automatically detect and evaluate traffic signs; the traffic information thus ascertained may be displayed to the driver, for instance, or perhaps used automatically in an electronic stability program or driver assistance function.

For dynamic traffic management, variable message signs (VMS) are often installed particularly on expressways, and display different traffic signs, especially speed limits, depending on the traffic or environmental situation.

In order to adapt the variable message signs to the brightness of their surroundings, they are often pulsed, that is, they are switched on and off (active phases and inactive phases) with a signal frequency f of 100 Hz, for instance, or a signal period $T=1/f$. These switching operations take place so rapidly that they are not discernible to the human eye.

However, in order to reduce motion blur, camera-based driver assistance systems record images with the shortest exposure time possible. Given short exposure times of less than 1 ms, for example, and readout rates (photo frequencies) of, e.g., 30 images per second, the entire photo-taking period of the exposure may be such that the variable message sign is switched off during this time or is in an active phase. Thus, it is possible that a variable message sign will not be picked up by the camera. Sometimes variable message signs are also exposed while being pulsed in some areas, so that a camera may possibly pick up only partial areas of the variable message sign.

In order to reliably detect variable message signs, generally many successive photos are therefore taken, that is, with a high readout rate of the image sensor, so as to completely recognize the variable message sign in one of the images taken.

It turns out, however, that even at high readout rates, problems sometimes occur in detecting variable message signs. For example, the variable message signs may have a period duration of 100 Hz, so that an image sensor having a typical exposure duration of $\leq 1$ ms and a readout rate or photo frequency of, e.g., 30 images per second, i.e., 30 Hz, often does not pick up a variable message sign during its active period of time, especially if the variable message sign is only within the field of view of the camera for a brief time or the vehicle is moving rapidly.

Although the probability of recognizing a variable message sign may be increased when working with higher exposure durations, the image also becomes brighter, so that the image sensor may possibly go into saturation, with the result that details are no longer ascertainable.

The German Published Patent Application No. 10 2010 024 415 proposes that an image sensor sense incoming light constantly or continuously with a maximum readout time; the intention is thereby to prevent the flickering of an LED detected by the camera system. The pause time, during which the image sensor is not converting the light falling on it into electrical signals or is not photosensitive, is selected to be less than one pulse duration with respect to light pulses to be detected, so that no light pulse is "overlooked" by the sensor. To prevent the sensor from becoming overexposed or going into saturation, an attenuation filter or an iris diaphragm is provided which may be adjusted according to the lighting conditions, especially day or night.

Consequently, an additional optical element is used to detect high-frequency signal sources. However, at high frequencies of the signal source, a correspondingly high attenuation is necessary, which in turn may lead to quality impairments for further image acquisition and image evaluation.

The German Published Patent Application No. 10 2005 033 863 describes an image-recording system in which, in addition to a camera, a radiation sensor is provided that ascertains an average brightness level of an image scene and compares it to the brightness of an image taken by the camera. Due to the longer readout time, the radiation sensor also senses pulsed light sources. If a discrepancy is revealed between the two brightnesses, a warning signal is output to the effect that there is a deficiency in the display representation; the exposure phase of the camera and the switch-on phase of the pulsed light source are synchronized, or areas of the images shown on the display are replaced by areas exposed for a suitably longer time.

The disadvantage in this design approach is that a further radiation source is needed which must be synchronized with the camera, thereby increasing manufacturing effort and cost.

In addition, multimodal camera controls are known, especially also as High Dynamic Range (HDR) camera systems, in which successive images are produced using different parameter settings, particularly with different exposure times. German Patent No. 698 08 024 describes such a system. Subsequently, an optimized image may be generated from image areas having different brightnesses by, for example, taking over dark areas from the image exposed a longer time and bright areas from the image exposed a shorter time. To that end, the image sensor may be controlled in such a way that it takes photos during different exposure times in alternation, and thus the image signal output has a plurality of alternating subsequences of frames with different exposure times.

SUMMARY

According to the present invention, the image sensor is provided with a filter mask. Thus, various filters are provided on the individual sensor pixels; in this context, the filter mask also has attenuation filters, and sensor pixels—in front of which an attenuation filter is disposed—form attenuation pixels and output an attenuation pixel signal; the control and evaluation device utilizes these attenuation pixel signals for an evaluation.

In particular, the attenuation filters are able to attenuate white incident light more strongly than the other filters of the filter mask; this means that white light, which has intensity components in the entire optically visible range, especially with essentially equal or equi-energy intensity distribution over the spectral range, is attenuated more strongly by the attenuation filters than by the other filters of the filter mask.

In particular, the attenuation filters may be blue color filters, i.e., blue filters, which preferably pass light of a lower wavelength range or with shorter wavelengths. This light of the lower wavelength range is therefore referred to hereinafter as blue light, the sensor pixels behind the blue filter are referred to as blue pixels and their pixel signals are referred to as blue pixel signals. In particular, blue filters of this kind may be B-filters of an RGB system, but may also be cyan filters of a CMY or CMYK system, for example, which transmit the short-wave light components in their respective system.

The image sensor is read out with different exposure times, especially by turns, so that two or more subsequences of frames are formed with different exposure times. In this connection, the attenuation pixel signals of a second subsequence taken with a longer second exposure time are evaluated.

Several advantages are achieved in this manner:

The invention is based on the idea that the attenuation pixels, particularly blue pixels, i.e., sensor pixels provided with a blue filter, exhibit markedly less sensitivity than other sensor pixels. In the case of a color filter, blue pixels exhibit considerably less sensitivity than especially green pixels or transparent pixels (clear pixels, C-pixels), and additionally also less than red pixels. In general, blue pixels are utilized scarcely or not at all for an image evaluation.

As, according to the present invention, frames are now shot with different exposure times, a subsequence of frames having a longer exposure time may be selected, in which the sensor pixels provided with attenuation filters, especially blue pixels, are not yet in saturation. In the meantime, the further pixels in particular will be in saturation, and therefore are preferably not further evaluated.

On the other hand, blue pixels supply a signal which possesses considerable information content. The low sensitivity of the blue pixels for white light, for example, and the very long exposure times therefore achievable permit the reliable recognition of variable message signs or signal sources having high signal frequency or short signal periods.

Therefore, from the attenuation pixel signals of the second subsequence, it is possible to generate a two-dimensional sub-image which subsequently may be evaluated, e.g., for an image recognition, in order to detect and preferably also to evaluate higher-frequency signal sources.

In this connection, it is also recognized in the present invention that variable message signs generally contain white light, so that the attenuation pixels, especially blue pixels, exhibit sufficient sensitivity to ensure image acquisition and reliable evaluation owing to greater exposure times.

In particular, a color-filter mask, e.g., an RGGB pattern or Bayer pattern may be used as filter mask, or perhaps a partial-color filter mask which, in addition to blue filters and red filters, for example, also has transparency values, for instance, or intensity values.

The long exposure time is selected particularly as second subsequence in addition to a first subsequence, which has a short first exposure time and may be utilized in customary manner for an image recognition and image evaluation, especially for a colored image evaluation, as well.

In this context, the at least two subsequences may alternate by turns. However, developments are also possible in which the subsequences do not alternate by turns, so that, for example, for two frames of the first subsequence for a normal image evaluation, there is one frame of the second subsequence for detecting variable message signs.

In addition, the relationship of the subsequences may also vary depending upon whether variable message signs are to be expected.

A further advantage of the present invention is that image acquisition and image evaluation for other purposes, particularly image display and driver-assistance systems, are not impaired by the second subsequence.

A considerable advantage also lies in the fact that in principle, additional hardware or supplementary equipment is not necessary. A suitable control of the image sensor, particularly by two or perhaps more subsequences with the different exposure times, is sufficient.

A further advantage is that multimodal camera controls, i.e., the formation of a plurality of subsequences, are already known as such, especially from HDR methods. Thus, it is possible to resort to control algorithms or software blocks which only have to be appropriately altered. Consequently, a cost-effective realization is possible. Unlike in the case of HDR methods, in principle no evaluation by comparing all frames and partial areas of the frames of the subsequences is necessary in the present invention. Furthermore, it is not necessary to generate a composite image. Thus, an evaluation solely of the blue-pixel signals of the second subsequence is sufficient.

However, a comparison of the subsequences may additionally be provided in the present invention, because from the image acquisition and image evaluation of the first subsequence, the position of possible variable message signs is recognized, for example, as a traffic-sign bridge above the roadway or perhaps as a sign by the side of the roadway. Upon recognition of a high probability of a variable message sign, the second subsequence may then possibly be evaluated, particularly in these image areas, or the proportion of the second subsequence may be increased for a certain period of time.

In addition, the advantage is also yielded that typical color patterns, like especially the RGGB-pattern (Bayer pattern) may be used, since the proportion of blue pixels of one fourth is already sufficient to achieve a sub-image of blue pixel signals with adequate resolution.

The first and second exposure times may be adapted to the ambient brightness, that is, particularly day and night.

Thus, for example, it is also possible to change only the first exposure time in order to permit the customary image acquisition and image evaluation as a function of the daytime conditions, without a change of the second exposure time if no change of the variable message signs is to be expected at night.

According to a further specific embodiment of the present invention, in addition, an optical element may be provided in the light path, particularly within the camera in front of the camera lens system or between the camera lens system and the filter mask. In this case, the optical element is adjustable in its attenuation or transmissivity in order to permit higher attenuation or lower transmissivity especially for variable message signs, thereby allowing longer exposure times.

This yields the advantage that the sensitivity of the image sensor is adjustable dynamically, in particular may also be reduced dynamically, so as to permit reliable recognition of the variable message signs.

In this context, a longer exposure time may be made possible during the day, for example, by the fact that the optical element attenuates more strongly, and in a dark environment, i.e., especially at night or dusk, high transmissivity or complete transmissivity may be achieved. Thus, in each case long exposure times may be achieved, which permit the recognition of a variable message sign in every image taken. In particular, such an optical element may be controllable from outside, i.e., especially by the control and evaluation device. In this connection, the control and evaluation device may be one-piece, or perhaps be formed by a plurality of individual control elements.

The hardware of the optical element may be realized with a liquid-crystal panel, for example, having a construction similar to an LCD flat screen.

In addition, an automatic darkening may also be provided, e.g., by chemical effects; such hardware implementations are already known in principle, e.g., in the case of self-tinting sunglasses. This yields the advantage that no additional control is necessary; however, if desired, a signal may be output by the optical element to the control and evaluation device in order to indicate its degree of transmissivity or its attenuation.

In all the embodiments, the entire optical element may be adjusted between two stages—attenuation on and attenuation off—or perhaps may be varied in several intermediate stages, e.g., continuously, as well; the tuning is thus more precise in the case of several intermediate stages.

A further advantage is obtained if the optical element is subdivided into a plurality of segments. The different segments of the optical element may thus be controlled differently. Therefore, in particular an image area in which a variable message sign is to be expected may be darkened more, that is, the segment in this area may be adjusted to be more strongly attenuating. In this case, the variable message signs may be identified by image recognition of the image acquired or perhaps from map data. In addition, the segment-wise control may also be utilized to more strongly attenuate bright image areas such as the sky in the vehicle environment. According to the invention, this yields an advantageous effect since variable message signs are usually placed in an upper image area, especially on traffic-sign bridges, in which a bright sky is also to be expected, so that stronger attenuation is especially advantageous here.

For example, the subdivision into segments may relate to upper image areas and lateral image areas. In principle, a segmentation except for pixel resolution is also possible, so that image pixels may be attenuated separately.

DETAILED DESCRIPTION

Figure 1:
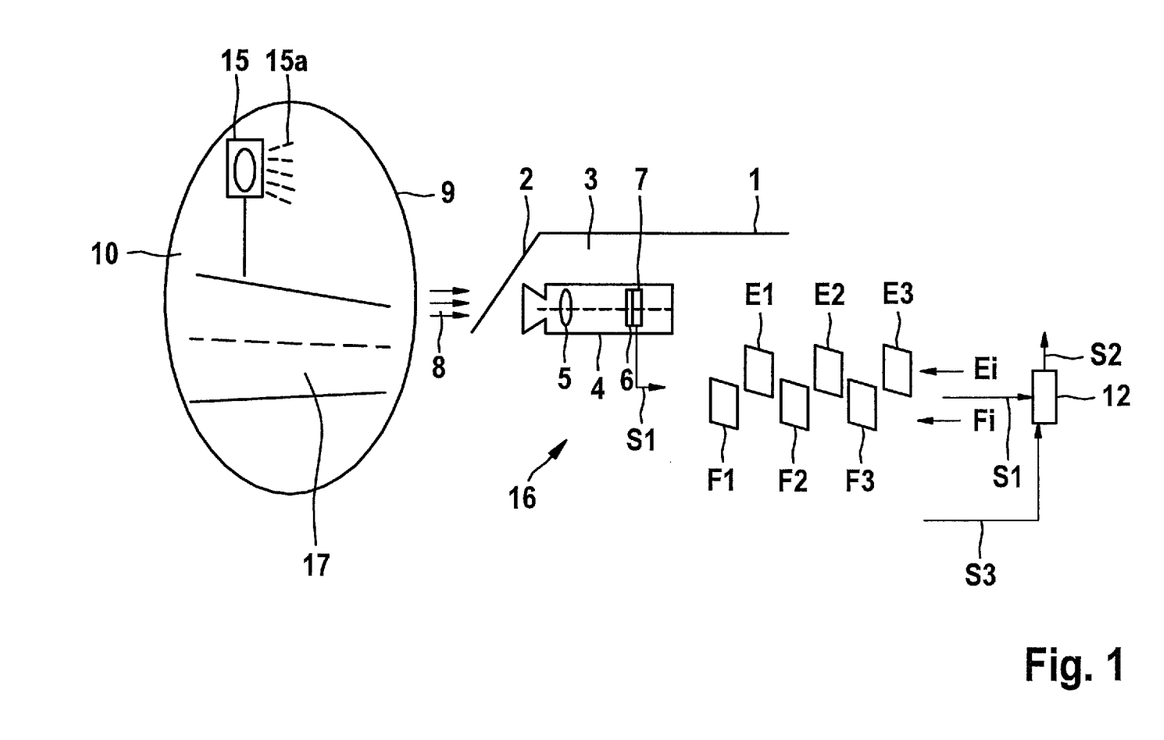
FIG. 1 shows a vehicle having a camera system according to one specific embodiment of the present invention.

In a vehicle 1 having windshield 2 and vehicle interior 3, a camera 4 is provided which has a camera lens system (lens) 5 and an image sensor 7 having a filter mask 6. Camera 4 picks up a coverage area 9 of vehicle environment 10 outside of vehicle 1 through windshield 2; thus light 8 from coverage area 9 gets through windshield 2 to camera 4 and is projected or imaged by camera lens system 5 through filter mask 6 onto image sensor 7. Image sensor 7 outputs image signals S1 to a control and evaluation device 12, which in turn outputs a camera image signal S2 for display on a display device, for example, and/or for a driver assistance function and/or for a vehicle control system.

Figure 2:
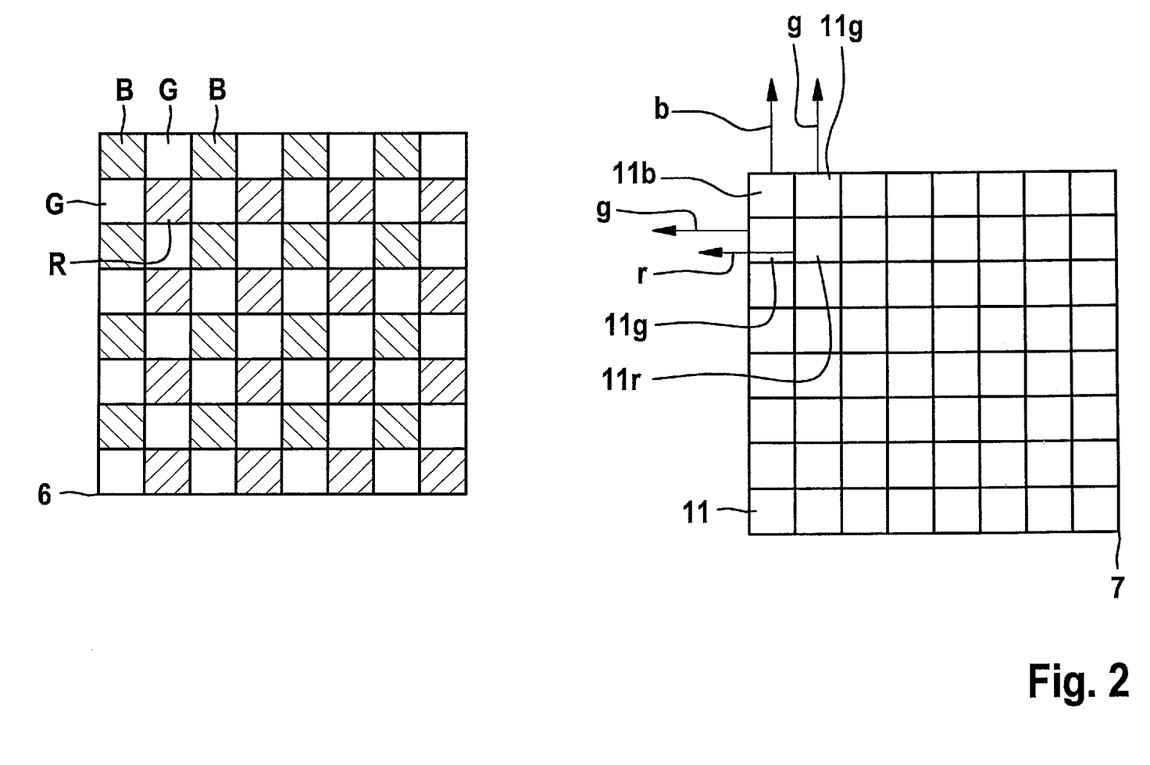
FIG. 2 shows top views of the filter mask and the image sensor from FIG. 1.

Image sensor 7 has a matrix array of sensor pixels 11. Red color filters R, green color filters G or blue color filters B are applied to sensor pixels 11 of image sensor 7, the color filters together forming filter mask 6 which here takes the form of an RGGB pattern or Bayer pattern. Depending on color filter R, G or B preset, sensor pixels 11 thus act as red pixels 11r which output red pixel signals r, green pixels 11g which output green pixel signals g or blue pixels 11b which output blue pixel signals b. Image signal S1 of image sensor 7 is therefore made up of red, green and blue pixel signals r, g, b of all sensor pixels 11 of all output images (frames, individual images).

Figure 3:
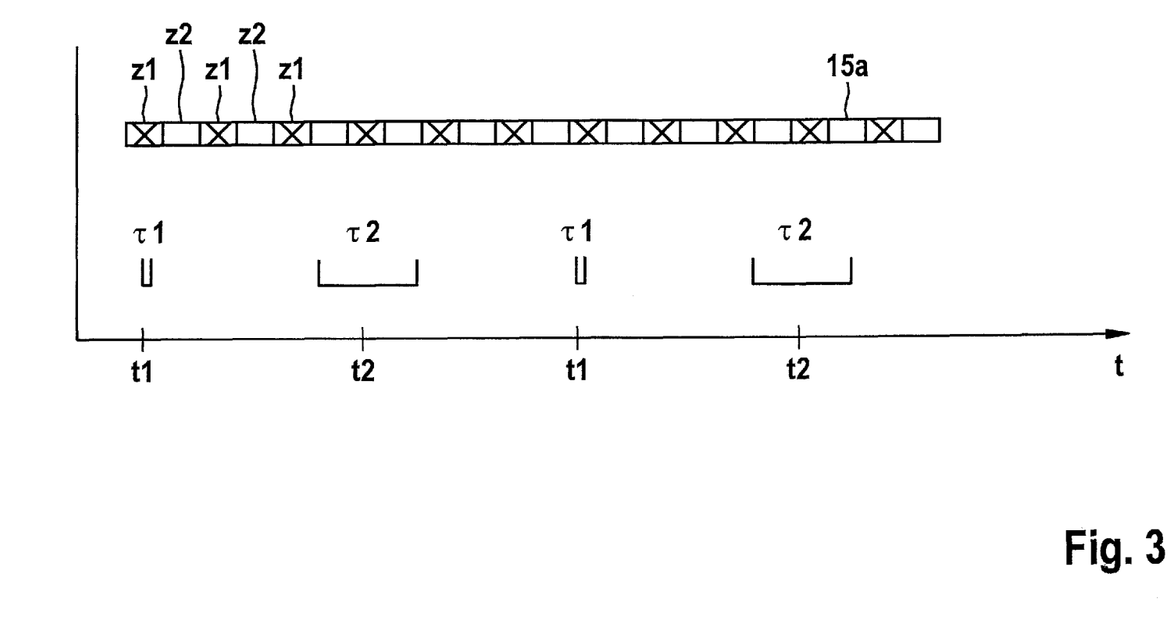
FIG. 3 shows a timing diagram having an illustration of the control of a variable message sign and the reading of the image sensor.

Image sensor 7 is read out with a sampling rate (readout rate, photo rate) fa of fa=30 Hz, for example, so that 30 images E1, F1, E2, F2, E3, F3, ... are output per second by image sensor 7 as image signal S1. In this context, image sensor 7 is read out with different exposure times $\tau 1$ and $\tau 2$, as shown in FIG. 3:

At a first readout instant t1, image sensor 7 is read out with a shorter first exposure time (exposure duration) $\tau 1$ of 1 ms, for example, and at a following second readout instant t2 with a longer second exposure time $\tau 2$ of 15 ms, for example, or perhaps 20 ms. Therefore, image signal S1 according to FIG. 1 includes two alternating subsequences, namely, a first subsequence Ei having first images E1, E2, E3 and a second subsequence Fi having second images F1, F2, F3. Each image E1, E2, E3 and F1, F2, F3 contains all pixel signals r, g, b of all sensor pixels 11 of image sensor 7.

According to FIG. 1, in coverage area 9, camera 4 is picking up a variable message sign 15 that is outputting light signals 15a with a frequency f=1/T of 100 Hz, for example; in signal period T according to the top line in FIG. 3, light is being output in alternating fashion, that is, variable message sign 15 is illuminated and therefore an active signal z1 is output, and subsequently the variable message sign is not illuminated, and thus an inactive signal z2 is output. At a signal frequency of F=100 Hz and consequently a period duration T=10 ms, period durations T/2 of 5 ms therefore result for active signal z1 and inactive signal z2, respectively.

From first subsequence Ei, that is, first images E1, E2, E3 taken with first exposure time $\tau 1$, image processing of all pixel signals r, g, b, that is, of all sensor pixels 11r, 11g and 11b is subsequently carried out in customary manner, so that a color image of coverage area 9 may be ascertained and displayed to the driver on a display device, for instance, and may also be used for electronic stability programs, for example, and image-recognition algorithms. Since $\tau 1 < T/2$, individual first images E1, E2, E3 do not always capture active signals z1 of variable message sign 15. According to FIG. 3, at first readout instant t1, exactly one active signal z1 is acquired; at following readout instant t1, exactly only one inactive signal z2 is acquired, so that variable message sign 15 is not read out or is not read out correctly.

However, second subsequence Fi contains second images F1, F2, F3 which are read out with second exposure time $\tau 2$, where $\tau 2 > T/2$, advantageously even $\tau 2 > T$, and therefore an active signal z1 is always sensed, as well. Because of long exposure time $\tau 2$, green pixel signals g are considerably overexposed, at least in the case of photos in the daytime; given long exposure time $\tau 2$, green pixels 11g are far into saturation and therefore supply no utilizable information. Red pixels Rr are also far into saturation, so that the red pixel signals supply no utilizable information. Control and evaluation device 12 utilizes second subsequence Fi in order to evaluate blue pixel signals b from second images F1, F2, F3, respectively, so that an image evaluation of sensor pixels 11b forming a sub-matrix is carried out here, sensor pixels 11b therefore supplying a sub-image. Consequently, no color information is obtained from second subsequence Fi; rather, initially an image evaluation may be carried out on sub-image 30-B including only blue pixel signals b, in order to ascertain variable message signs 15 and to detect their information content.

In principle, second subsequence Fi may be evaluated without comparison to first subsequence Ei. Additionally, however, by evaluating first subsequence Ei, control and evaluation device 12 is also able to ascertain the position of a roadway 17, for example, and from that the position or possible position of variable message sign 15, that is, by the side of roadway 17 and/or above roadway 17, and to assess this as condition for recognizing a variable message sign 15. In so doing, for example, an algorithm for shape recognition may be implemented on the first images in order first of all to detect a possible variable message sign 15, e.g., as a sign alongside of or especially above the roadway.

Figure 4:
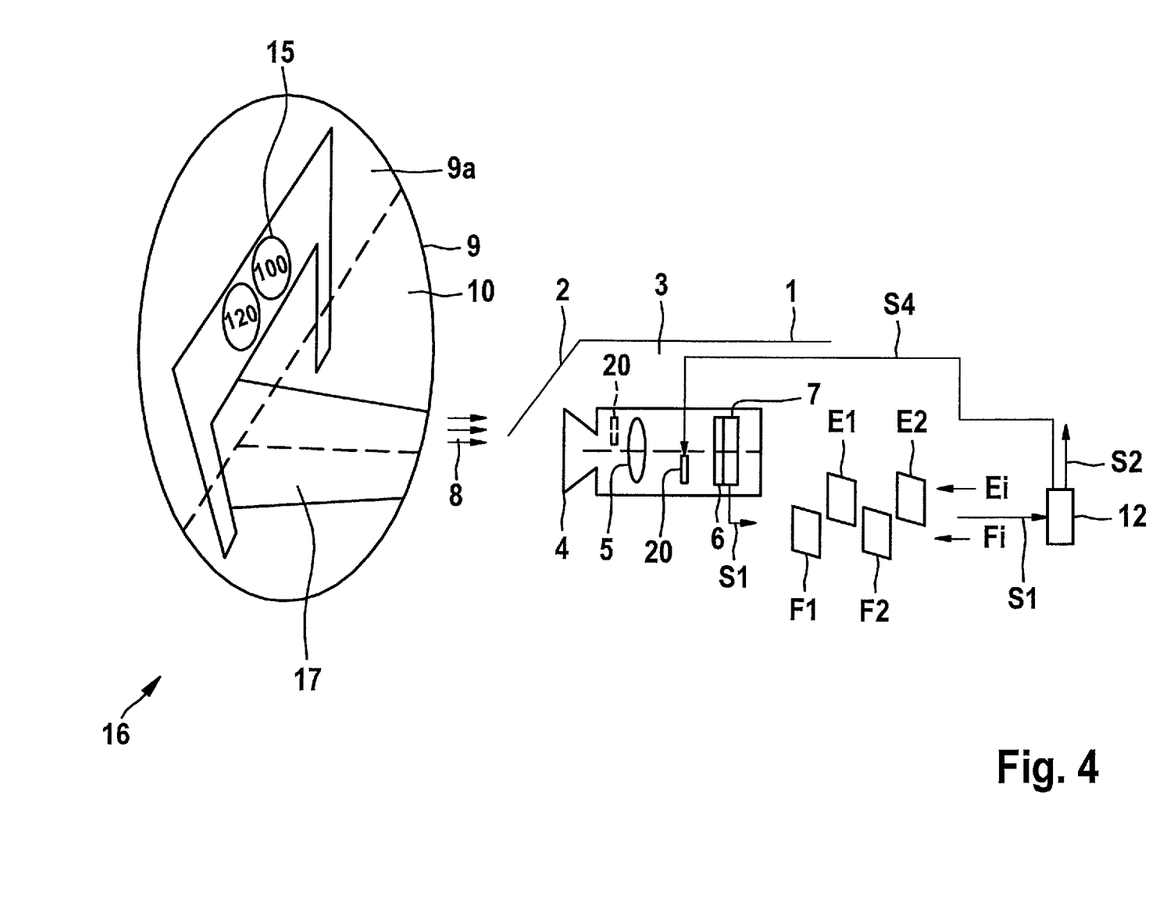
FIG. 4 shows a camera system according to a further specific embodiment.

Control and evaluation device 12 may also receive map data S3, e.g., from a navigation system and/or stored map information, in order to ascertain the position of variable message signs 15, e.g., for speed limit. FIG. 1 shows, by way of example, the position of a variable message sign 15 alongside of roadway 17; FIG. 4 shows, purely exemplarily, the position of a variable message sign 15 above roadway 17.

FIG. 4 shows a further specific embodiment in which additionally an optical element 20 is provided in the light path of camera 4. As shown in FIG. 4, optical element 20 may be provided between camera lens system 5 and image sensor 7 having filter mask 6 or, as marked in with a broken line, may be provided upstream of camera lens system 5. In this case, optical element 20 is advantageously positioned in such a way that it covers or filters a first partial area 9a of coverage area 9, which includes an upper image section 30a of image 30, for example, in which a variable message sign 15 is generally positioned.

Optical element 20 advantageously has an attenuating effect, that is, it reduces the intensity. Thus, it may take the form of a neutral density filter which attenuates the intensity independently of the wavelength or also attenuates the intensity in wavelength-selective manner. Advantageously, the attenuation is a function of intensity I; to that end, particularly green pixel signals g or, in the case of a different color pattern, signals of the sensor pixels behind transparent color-filter pixels may also be utilized. Thus, during the day or in the case of high intensity, optical element 20 has an attenuating or strongly attenuating effect, whereas at night or dusk, that is, when vehicle environment 10 is dark, it has no or at most a slight attenuating effect. In a dark environment such as night or dusk, optical element 20 is advantageously completely transparent or translucent, so that camera 4 together with its image sensor 7 is able to acquire images in accordance with FIG. 1, that is, in accordance with the construction without optical element 20.

Differing from the specific embodiment of FIG. 4, a specific embodiment may also be provided in which optical element 20 extends completely over coverage area 9.

Moreover, optical element 20 may also have a plurality of separately controllable segments 20a, 20b, in order to attenuate image areas 30a and 30b of image 30 differently.

The size of individual controllable segments 20a, 20b may be equal to the size of one sensor pixel 11, but may also be larger up to at maximum the entire size of image 30 or of image sensor 7, so that optical element 20 is then formed in one piece or as a single segment. In the case of smaller segments 20a, 20b, it is advantageous to position optical element 20 according to FIG. 4 between camera lens system 5 and filter mask 6; in the case of segments 20a, 20b in the size of sensor pixels 11, they may in particular be applied directly on filters R,B,G.

However, it is recognized in the present invention that the formation of segments 20a, 20b to subdivide image 30 into several image areas, e.g., an upper image area 30a and a lower image area 30b, is also already advantageous, since first of all, variable message signs according to FIG. 4 are located above roadway 17, that is, in an upper image area 30a, and in addition, the sky is included in upper image area 30a in any case, and thus the intensity is high, so that an attenuation is already regarded as non-interfering or even advantageous here.

In subdividing optical element 20 into several segments 20a, 20b, especially also more than two segments 20a, 20b, the relevant segments or areas may be ascertained on the basis of algorithms. Thus, for example, a sign gantry may be detected or a position of a variable message sign 15 may be ascertained from map material. Furthermore, upon detection of a variable message sign 15, e.g., by pattern evaluation, a circle detection may also be carried out, so that this area is subsequently darkened in order to undertake a precise evaluation, especially qualitative evaluation of variable message sign 15 or its active signals z1.

In the case of the pixel-wise formation of segments 20a, 20b, optical element 20 may therefore be applied directly onto filter mask 6, or perhaps be combined with filter mask 6.

In particular, optical element 20 may be controlled by control signals S4 of control and evaluation device 12, so that control and evaluation device 12 is able to ascertain an intensity or brightness of vehicle environment 10 or perhaps of partial areas of vehicle environment 10 corresponding to coverage areas 9a, 9b, directly from green pixel signals g, for example, and from that, optical element 20 may be controlled accordingly and adjusted in its attenuation by control signals S4.

Optical element 20 may be implemented as a liquid-crystal panel, for instance, so that partial areas 20a, 20b may be formed as one or more liquid crystals, corresponding to an LCD flat screen.

Figure 5:
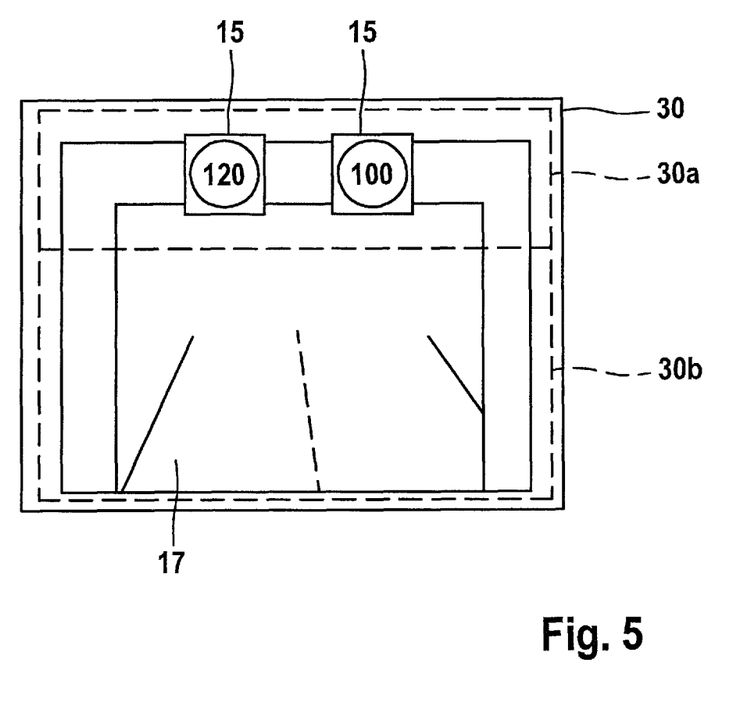
FIG. 5 shows an image having partial areas detected by the image sensor.

Camera image signal S2, output by control and evaluation device 12, is shown in FIG. 5 for the purpose of illustration.

Even without a control by control signals S4, an upper image area 30a may be darkened by optical element 20, for example, so that in particular the images of the road and the road users are not affected detrimentally by optical element 20.

In this connection, image area 30a to be darkened or to be attenuated may also be determined by algorithmic processes from ascertained camera image 30, possibly supplementally by position sensors of vehicle 1, e.g., a roll-angle sensor.

According to a further specific embodiment, optical element 20 may be adjusted so as to be attenuating for entire image 30. This may be implemented advantageously depending on the situation, for example, in each instance during the day and/or in the vicinity of variable message sign 15. Thus, optical element 20 corresponds to a mechanical iris diaphragm in photography.

According to another specific embodiment, optical element 20 takes the form of an electrically controllable disk, either in one piece or again having two or more segments 20a, 20b. For example, an electrochromic glass may be used for this purpose, such as is also used in electrically controllable day/night rearview mirrors.

According to a further specific embodiment, optical element 20 may also be a self-darkening disk which reduces the transmission of light automatically or in self-acting manner in response to greater ambient brightness. For instance, this may take place because of chemical effects like in the case of darkening or self-tinting sunglasses, for example. Thus, optical element 20 is again approximately completely light-transmitting in response to low ambient brightness such as at night, and attenuates the intensity during the day.

Even in a specific embodiment having automatically darkening optical element 20, that is, without control by control and evaluation device 12 or another device, optical element 20 may output status signals, e.g., to control and evaluation device 12 or perhaps to image sensor 7, so that the sensitivity of image sensor 7 or exposure times $\tau 1$, $\tau 2$ may be adjusted.

In each of the specific embodiments, it is possible both for the attenuation of optical element 20 or its segments 20a, 20b to be switchable in two stages, i.e., on or off, and to be adjustable in several intermediate stages, i.e., with different attenuation factors.

Thus, in the case of the specific embodiments according to FIG. 4 having optical element 20, longer exposure times may be set during active attenuation; according to the diagram in FIG. 3, longer first exposure times $\tau 1$ and/or longer second exposure times $\tau 2$ may be set. Therefore, in principle, recognition of a variable message sign is also possible by way of first subsequence Ei, by setting $\tau 1 > T/2$, especially $\tau 1 \geq T$.

What is claimed is:

1. A camera system, comprising:
    a camera that includes an image sensor and a filter mask; and
    a control and evaluation device that receives an image signal output by the image sensor, wherein:
        the image sensor includes an array of sensor pixels outputting pixel signals,
        the filter mask includes an array of filters that are situated in front of the sensor pixels and have different wavelength-selective transmission responses,
        a portion of the filters includes attenuation filters including blue filters for transmitting light in a short-wave wavelength range, and another portion of the filters including red filters,
        blue sensor pixels, in front of which in each case one of the blue filters is disposed, output blue attenuation pixel signals, and red sensor pixels, in front of which in each case one of the red filters is disposed, output red pixel signals,
        the image signal output by the image sensor has a first subsequence of first frames taken with a first exposure time and a second subsequence of second frames taken with a second exposure time,
        the second exposure time is greater than the first exposure time, and
        the control and evaluation device evaluates the blue attenuation pixel signals of the second subsequence, but omits evaluating the red filter pixels of the second subsequence, to recognize signal sources whose light signals have at least one of: a signal period which is greater than the first exposure time, or a signal frequency which is greater than a readout rate of the image sensor.

2. The camera system as recited in claim 1, wherein the blue attenuation filters attenuate incident white light more strongly than the red filters of the filter mask.

3. The camera system as recited in claim 1, wherein the filter mask further includes at least one of:
    green filters,
    intensity filters, or
    transparent filters.

4. The camera system as recited in claim 3, wherein the red filters and the green filters are arranged in one of a RGGB pattern and a RIIB pattern.

5. The camera system as recited in claim 1, wherein the sensor pixels, in front of which no attenuation filters are provided, one of are in saturation and go into saturation during the second exposure time.

6. The camera system as recited in claim 5, wherein the sensor pixels in front of which no attenuation filters are provided include one of green filters, intensity filters, transparent filters, and red filters.

7. The camera system as recited in claim 1, wherein from only the blue attenuation pixel signals in the second subsequence, the control and evaluation device at least one of generates a two-dimensional sub-image and performs an image evaluation.

8. The camera system as recited in claim 1, wherein from the first frames of the first subsequence, the control and evaluation device receives all pixel signals for an evaluation.

9. The camera system as recited in claim 8, wherein the evaluation is at least one of for display on a display device and for a vehicle control system.

10. The camera system as recited in claim 1, wherein the control and evaluation device carries out an image recognition using the first frames of the first subsequence in order to determine positions of signal sources in sub-images of the second subsequence.

11. The camera system as recited in claim 1, wherein the camera includes an optical element having one of a transparency, attenuation, and light transmission that is variable, the optical element being in a light path in front of the filter mask.

12. The camera system as recited in claim 11, wherein the optical element is controllable by the control and evaluation device in order to adjust a higher attenuation in response to a bright vehicle environment and lower or no attenuation in response to a darker vehicle environment.

13. The camera system as recited in claim 11, wherein the optical element is designed to be self-darkening or to automatically adjust its attenuation, and attenuates more strongly in response to at least one of high intensity of incident light and great brightness of a vehicle environment.

14. The camera system as recited in claim 13, wherein the optical element outputs a status signal concerning its attenuation.

15. The camera system as recited in claim 14, wherein the status signal is output to the control and evaluation device.

16. The camera system as recited in claim 11, wherein a difference in at least one of transparency, attenuation, and light transmission is adjustable in at least two stages.

17. The camera system as recited in claim 1, wherein the camera system is for a vehicle.

18. The camera system as recited in claim 1, wherein the signal sources include variable message signs.

19. A camera system, comprising:
    a camera that includes an image sensor, a filter mask, and an optical element having one of a transparency, attenuation, and light transmission that is variable, the optical element being in a light path in front of the filter mask; and a control and evaluation device that receives an image signal output by the image sensor, wherein:
the image sensor includes an array of sensor pixels outputting pixel signals,
the filter mask includes an array of filters that are situated in front of the sensor pixels and have different wavelength-selective transmission responses,
a portion of the filters includes attenuation filters,
sensor pixels, in front of which in each case one of the attenuation filters is disposed, outputs attenuation pixel signals,
the image signal output by the image sensor has a first subsequence of first frames taken with a first exposure time and a second subsequence of second frames taken with a second exposure time,
the second exposure time is greater than the first exposure time,
the control and evaluation device evaluates the attenuation pixel signals of the second subsequence, and
the optical element has a plurality of segments that are controllable individually, for different attenuation of an incident beam in different image areas.

20. The camera system as recited in claim 19, wherein the optical element is adjustable to be more strongly attenuating in those segments which correspond to image areas in which the control and evaluation device ascertains a higher probability for a signal source for higher-frequency signal light.

21. The camera system as recited in claim 19, wherein the optical element is adjustable to be more strongly attenuating in a segment in which an upper image area corresponding to a sky in the vehicle environment is to be imaged.

22. The camera system as recited in claim 19, wherein the control and evaluation device evaluates the attenuation pixel signals of the second subsequence to recognize signal sources including a variable message sign.

23. A method for ascertaining image information of a signal source pulsed as a function of time, comprising:
imaging light through a filter mask onto an image sensor of a multimodal camera;
one of filtering and attenuating incident light in different wavelength ranges by filters of the filter mask that are situated in front of sensor pixels of the image sensor;
outputting blue attenuation pixel signals from sensor pixels, in front of which attenuation filters including blue filters are disposed, and outputting red pixel signals from sensor pixels, in front of which red filters are disposed;
reading out the image sensor with at least a first subsequence having a short first exposure time and a second subsequence having a long second exposure time;
evaluating the blue attenuation pixel signals of the second subsequence, but omitting evaluating the red filter pixels of the second subsequence, to recognize signal sources whose light signals have at least one of: a signal period which is greater than the first exposure time, or a signal frequency which is greater than a readout rate of the image sensor.

24. The method as recited in claim 23, wherein the signal sources include variable message signs.

25. The method as recited in claim 23, wherein the evaluating at least one of: carries out an image recognition, or generates a two-dimensional sub-image.

* * * * *